United States Patent
Vasseur et al.

(10) Patent No.: US 9,887,874 B2
(45) Date of Patent: Feb. 6, 2018

(54) SOFT REROUTING IN A NETWORK USING PREDICTIVE RELIABILITY METRICS

(71) Applicant: Cisco Technology, Inc., San Jose, CA (US)

(72) Inventors: Jean-Philippe Vasseur, Saint Martin d'Uriage (FR); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 151 days.

(21) Appl. No.: 14/276,501

(22) Filed: May 13, 2014

(65) Prior Publication Data

US 2015/0333953 A1    Nov. 19, 2015

(51) Int. Cl.
| | |
|---|---|
| *H04L 12/24* | (2006.01) |
| *H04L 12/26* | (2006.01) |
| *H04L 12/707* | (2013.01) |
| *H04L 12/803* | (2013.01) |
| *H04L 12/801* | (2013.01) |

(52) U.S. Cl.
CPC ........ *H04L 41/0668* (2013.01); *H04L 43/062* (2013.01); *H04L 43/0876* (2013.01); *H04L 45/22* (2013.01); *H04L 47/122* (2013.01); *H04L 47/125* (2013.01); *H04L 47/127* (2013.01)

(58) Field of Classification Search
CPC ......... H04L 41/00; H04L 47/00; H04L 43/00; H04L 43/08
USPC .......................................... 370/228, 229, 351
See application file for complete search history.

(56) References Cited

U.S. PATENT DOCUMENTS

| | | | |
|---|---|---|---|
| 7,941,529 B2 | 5/2011 | Claise et al. | |
| 8,228,861 B1 | 7/2012 | Nix | |
| 8,654,765 B2 | 2/2014 | Singh et al. | |
| 2002/0176131 A1* | 11/2002 | Walters | G06F 8/65 398/58 |
| 2003/0048782 A1 | 3/2003 | Rogers et al. | |

(Continued)

FOREIGN PATENT DOCUMENTS

| | | |
|---|---|---|
| EP | 2728828 A1 | 5/2014 |
| WO | WO-02080417 A1 | 10/2002 |

OTHER PUBLICATIONS

A Multipath Routing Algorithm Based on Traffic Prediction in Wireless Mesh Networks; Zhiyuan Li, Ruchuan Wang; Communication and Networks, 2009, 1, 82-90; doi: 10.4236/cn.2009.12013 Published Online Nov. 2009.*

(Continued)

*Primary Examiner* — Melvin Marcelo
*Assistant Examiner* — Natali N Pascual Peguero
(74) *Attorney, Agent, or Firm* — Parker Ibrahim & Berg LLC; James M. Behmke; Stephen D. LeBarron

(57) ABSTRACT

In one embodiment, a plurality of paths in a network from a source device to a destination device is identified. A predicted performance for packet delivery along a primary path from the plurality of paths is determined. The predicted performance for packet delivery along the primary path is then compared to a performance threshold. Traffic sent along the primary path may be duplicated onto a backup path selected from the plurality of paths based on a determination that the predicted performance along the primary path is below the performance threshold.

18 Claims, 10 Drawing Sheets

(56) References Cited

U.S. PATENT DOCUMENTS

| | | | |
|---|---|---|---|
| 2003/0204616 A1* | 10/2003 | Billhartz | H04L 12/5695 709/235 |
| 2005/0229038 A1* | 10/2005 | Jinzaki | H04L 1/0009 714/18 |
| 2009/0064248 A1* | 3/2009 | Kwan | H04L 12/1868 725/109 |
| 2010/0138488 A1* | 6/2010 | Fletcher | H04J 3/1617 709/203 |
| 2012/0307842 A1* | 12/2012 | Petrov | H04N 21/23608 370/474 |
| 2013/0089100 A1* | 4/2013 | Zhao | H04L 45/28 370/395.5 |
| 2013/0262703 A1 | 10/2013 | Dong et al. | |
| 2014/0105033 A1 | 4/2014 | Vasseur et al. | |

OTHER PUBLICATIONS

International Search Report and Written Opinion dated Aug. 31, 2015 in connection with PCT/US2015/029212.

Sajassi, et al., "BGP MPLS Based Ethernet VPN", Network Working Group, Internet Draft, draft-ietf-l2vpn-evpn-07, May 2014, 50 pages, The Internet Engineering Task Force Trust.

* cited by examiner

SOFT REROUTING IN A NETWORK USING PREDICTIVE RELIABILITY METRICS

TECHNICAL FIELD

The present disclosure relates generally to computer networks, and, more particularly, to performing soft rerouting in a network using predictive reliability metrics.

BACKGROUND

Enterprise networks are carrying a very fast growing volume of both business and non-business critical traffics. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

As the number of business and non-business critical applications increases, so too are the number and variety of service level agreements (SLAs) that may be in use by a network. In general, an SLA refers to a target or threshold level of performance guaranteed by the network, and may be associated with a particular type of traffic. For example, many real-time business applications are very bandwidth demanding and having corresponding SLAs that are used to ensure that a certain amount of network bandwidth is available for a particular flow of traffic.

Traditionally, reactive techniques have been used to enforce network performance criteria, such as SLAs. First, the network itself is engineered by defining the application SLAs, quality of service (QoS) parameters, security settings, etc. Next, the performance criteria are monitored in view of the network's performance. If the performance criteria are not met, adjustments may then be made to the network in a reactive manner. However, such a reactive approach may also, by its very nature, mean that the network experiences periods of reduced performance before corrective measures are taken.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a plurality of paths in a network from a source device to a destination device is identified. A predicted performance for packet delivery along a primary path from the plurality of paths is determined. The predicted performance for packet delivery along the primary path is then compared to a performance threshold. Traffic sent along the primary path may be duplicated onto a backup path selected from the plurality of paths based on a determination that the predicted performance along the primary path is below the performance threshold.

DESCRIPTION

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
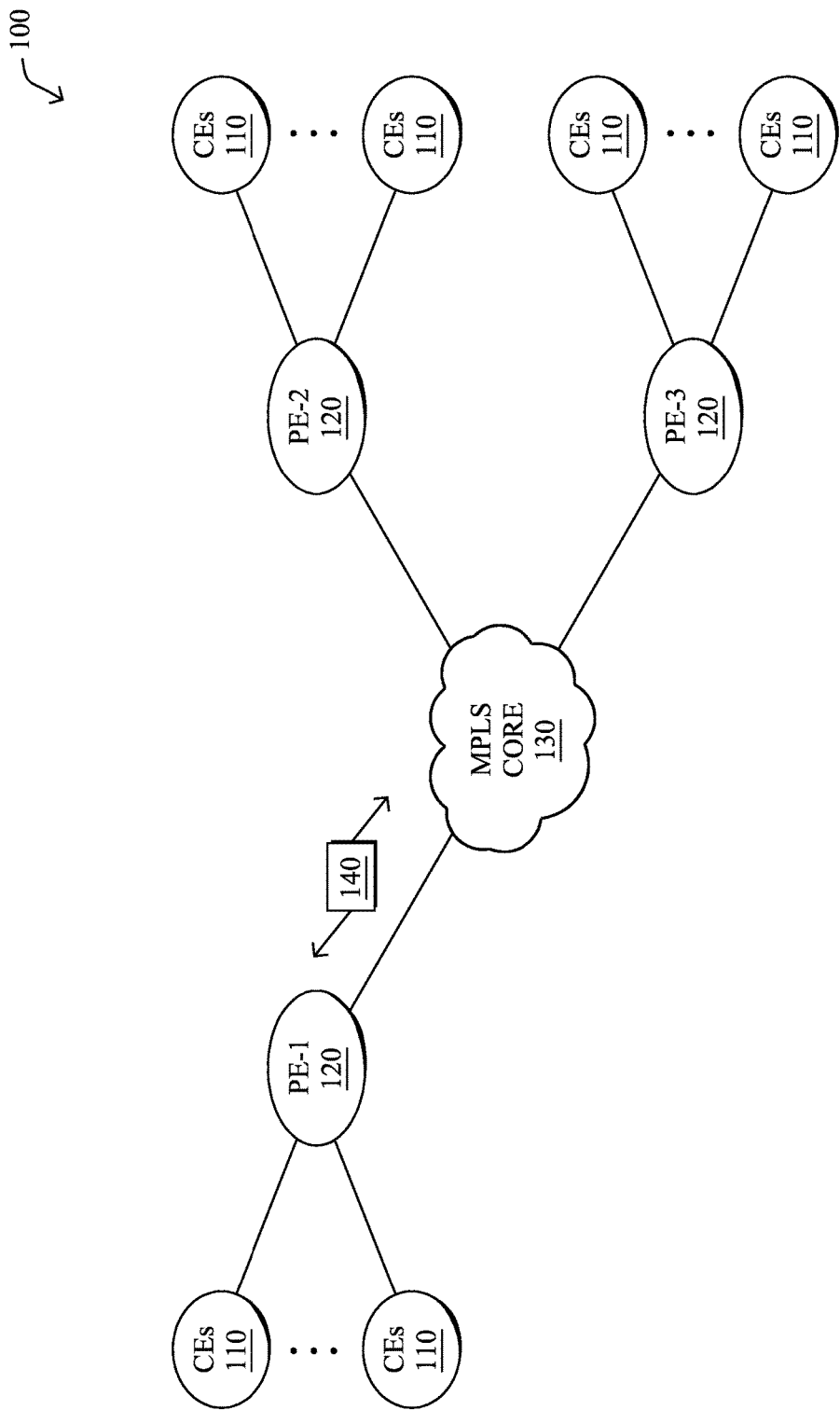
FIG. 1 illustrates an example communication network.

FIG. 1 is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative Multi-Protocol Label Switching (MPLS) core network 130. Alternatively, or in addition to, routers 110, 120 may be interconnected across a public Internet network. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router (or a set of routers) may be connected to a private network (e.g., dedicated leased lines, an optical network, etc.) or a virtual private network (VPN), such as an MPLS VPN thanks to a carrier network, via one or more links exhibiting very different network and SLA characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potential a backup link (e.g., a 3G/4G/LTE connection).

Notably, MPLS VPN links are usually tied to a committed SLA, whereas Internet links may either have no SLA at all or a loose SLA (e.g., a "Gold Package" Internet service connection that guarantees a certain level of performance to a customer site).

4.) Site Type C: a site of type B (e.g., types B1, B2 or B3) but with more than one CE router (e.g., a first CE router connected to one link while a second CE router is connected to the other link), and potentially a backup link (e.g., a wirleless 3G/4G/LTE backup link). For example, a particular customer site may include a first CE router 110 connected to PE-2 and a second CE router 110 connected to PE-3.

As will be appreciated, the above topologies are illustrative only and the techniques herein may be used in any other form of computer network. For example, the techniques herein may be adapted for use in a mesh network, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the public Internet or a private network.

Figure 2:
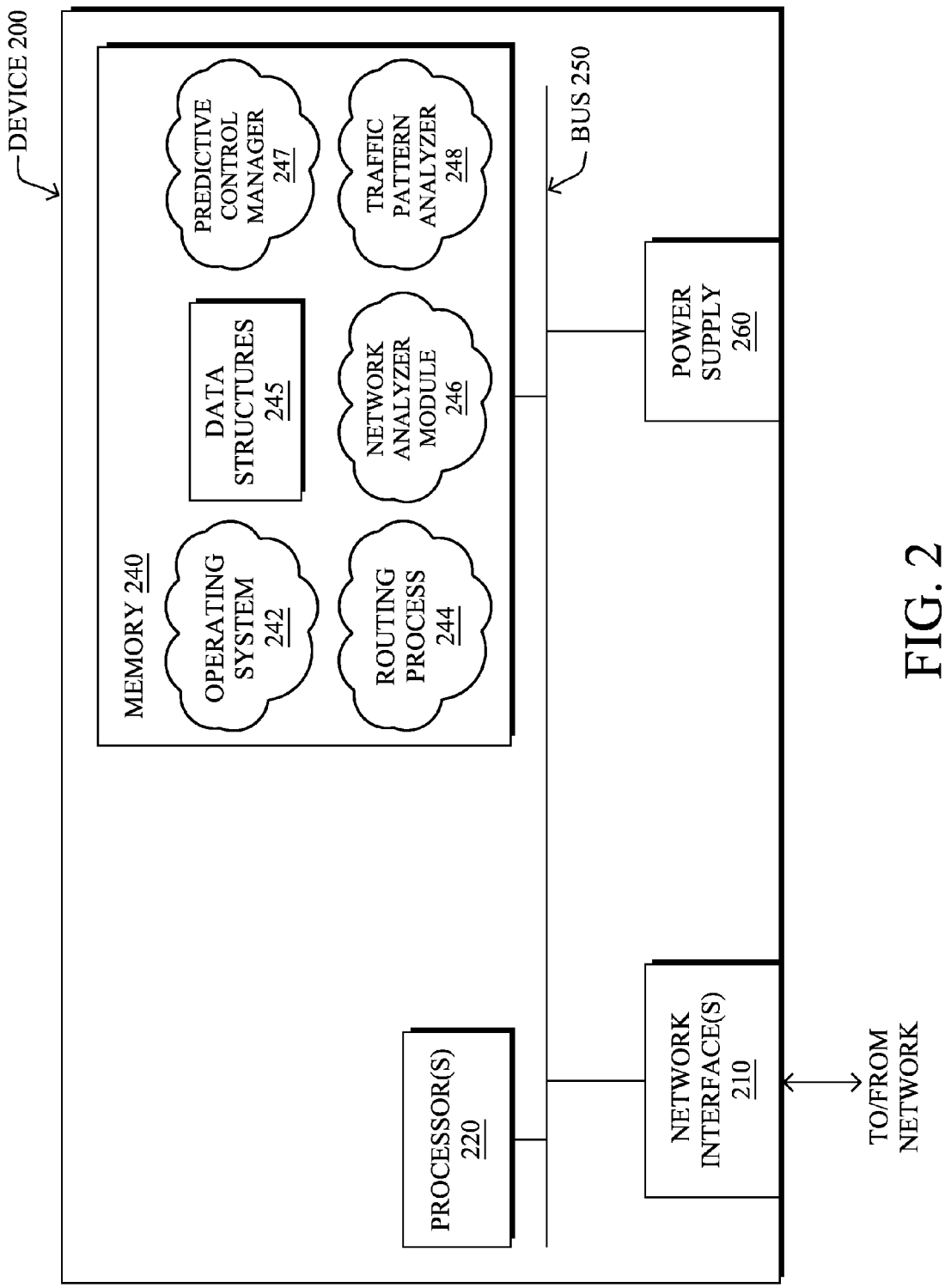
FIG. 2 illustrates an example network device/node.

FIG. 2 is a schematic block diagram of an example node/device 200 that may be used with one or more embodiments described herein, e.g., as any of the routers as shown in FIG. 1, particularly the PEs 120, CEs 110, a network controller (e.g., a device associated with a network operations center (NOC)), or any other computing device that supports the operations of network 100 (e.g., switches, etc.). Device 200 comprises a plurality of network interfaces 210, one or more processors 220, and a memory 240 interconnected by a system bus 250 and powered by a power supply 260. The network interfaces 210 includes the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processes and/or services executing on the device. These software processes and/or services may comprise routing process 244 (e.g., routing services) and illustratively, a network analyzer module (NAM) 246, a predictive control manager (PCM) 247, and/or a traffic pattern analyzer (TPA) 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instances, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-l2vpn-evpn>, introduces a solution for multipoint L2VPN services, with advanced multi-homing capabilities, using BGP for distributing customer/client media access control (MAC) address reach-ability information over the core MPLS/IP network.

In some implementations, routing services 244 may include a distributed application policy infrastructure controller (dAPIC) that operates to enforce application-specific policies on the local device. For example, the dAPIC may receive application-specific SLAs from a network controller via application programming interface (API) calls. Such information may be used, in some cases, to make routing decisions based on the type and priority of an application, as well as the performance of the various network links available to the device. In other words, the dAPIC in routing services 244 may be part of an application centric infrastructure (ACI) that operates to centralize network automation and facilitate the use of policy-driven application profiles throughout the network.

As noted above, traffic and network characteristics may be highly dynamic, making WAN optimization challenging. In addition, the variety of access links that may be involved (e.g., cable, A/V/DSL, links over private or public networks, etc.), potentially with guaranteed SLAs or semi-guaranteed SLAs, further complicates the task of network optimization. In some cases, customer sites may also be connected to backup links (e.g., 3G/4G/LTE wireless links) that provide highly varying performances in terms of connectivity and bandwidth.

According to various embodiments described herein, a dynamic, predictive performance architecture is disclosed that may be implemented in a network, such as a multi-service, multi-carrier WAN. In particular, NAM 246, PCM 247, and/or TPA 248 may operate in conjunction to perform predictive networking, in contrast with existing approaches that rely on reactive networking techniques. In some aspects, TPA 248 may be responsible for tracking all possible attributes of the traffic that is flowing through a router or other device, in order to make predictions regarding the traffic. For example, these attributes may be used to characterize traffic flows over the course of time and to generate profiles that can be used for prediction. In another aspect, NAM 246 may be used to generate an analytical model of the attributes of the network (potentially as a function of time), in order to predict network performance. In a further aspect, PCM 247 may gather application-specific SLAs (e.g., from the ACI controller/dAPIC of routing services 244) and correlate the application-specific SLAs with the predicted traffic profile and network performance, to perform closed-loop control that meets the application-specific SLAs. According to various embodiments, processes 244 and 246-248 may be co-located or may be distributed across different network devices. Further, while certain functions are described herein with respect to a particular one of processes 244, 246-248, the functions may be incorporated into any of the other processes, in various other embodiments. In various implementations, processes 244 and 246-248 may be co-located or may be distributed across different network devices. Further, while certain functions are described herein with respect to a particular one of processes 244, 246-248, the functions may be incorporated into any of the other processes, in various other embodiments.

Figure 3:
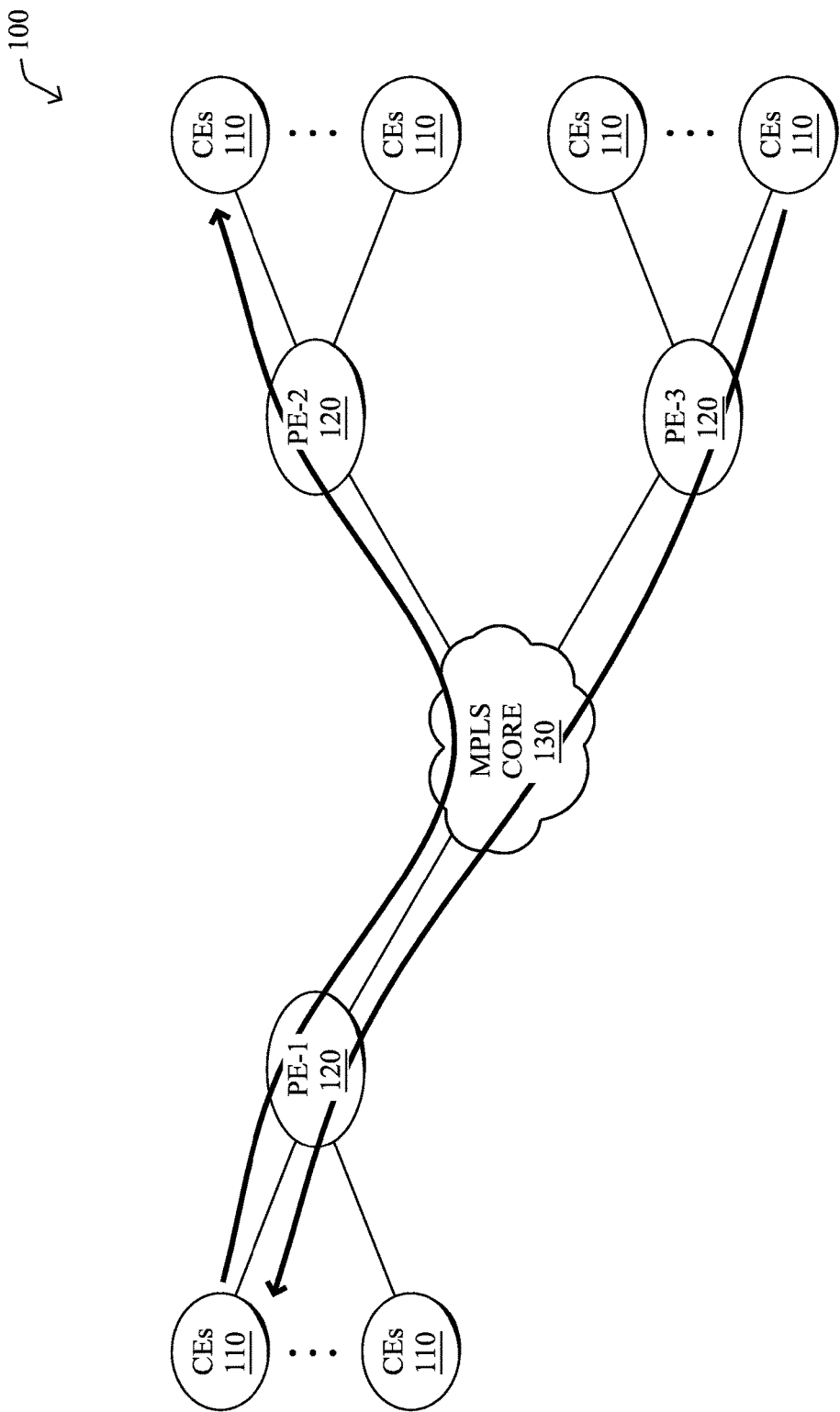
FIG. 3 illustrates an example view of traffic flowing within the communication network of FIG. 1.

Numerous types of application traffic may be flowing through current day networks. For example, as shown in FIG. 3, a particular CE 110 located at a customer site may provide and receive different forms of application traffic that is communicated through network 100. For example, traffic associated with a given customer site may include, but is not limited to, video data (e.g., video conferencing data), audio data (e.g., voice-over-IP (VoIP)), enterprise resource planning (ERP) data, customer relationship management (CRM) data, and the like. Each form of traffic may have specific network requirements and may be very demanding with respect to network availability and resiliency, such that even small deviations in network conditions may render an application incapable of providing the requisite experience to the end user. For example, low network performance may result in a video conference appearing choppy to the end users.

According to various embodiments, a predictive performance methodology for WANs and other forms of networks is introduced that that allows for its use across varying network architectures, application requirements, and deployment strategies, as well as in the presence of dynamic traffic and network performances. As detailed below, such an architecture may make use of machine learning techniques, in some embodiments, to evaluate future network requirements and performance, and to take corrective measures within the network to ensure the SLAs are met.

Figure 4A:
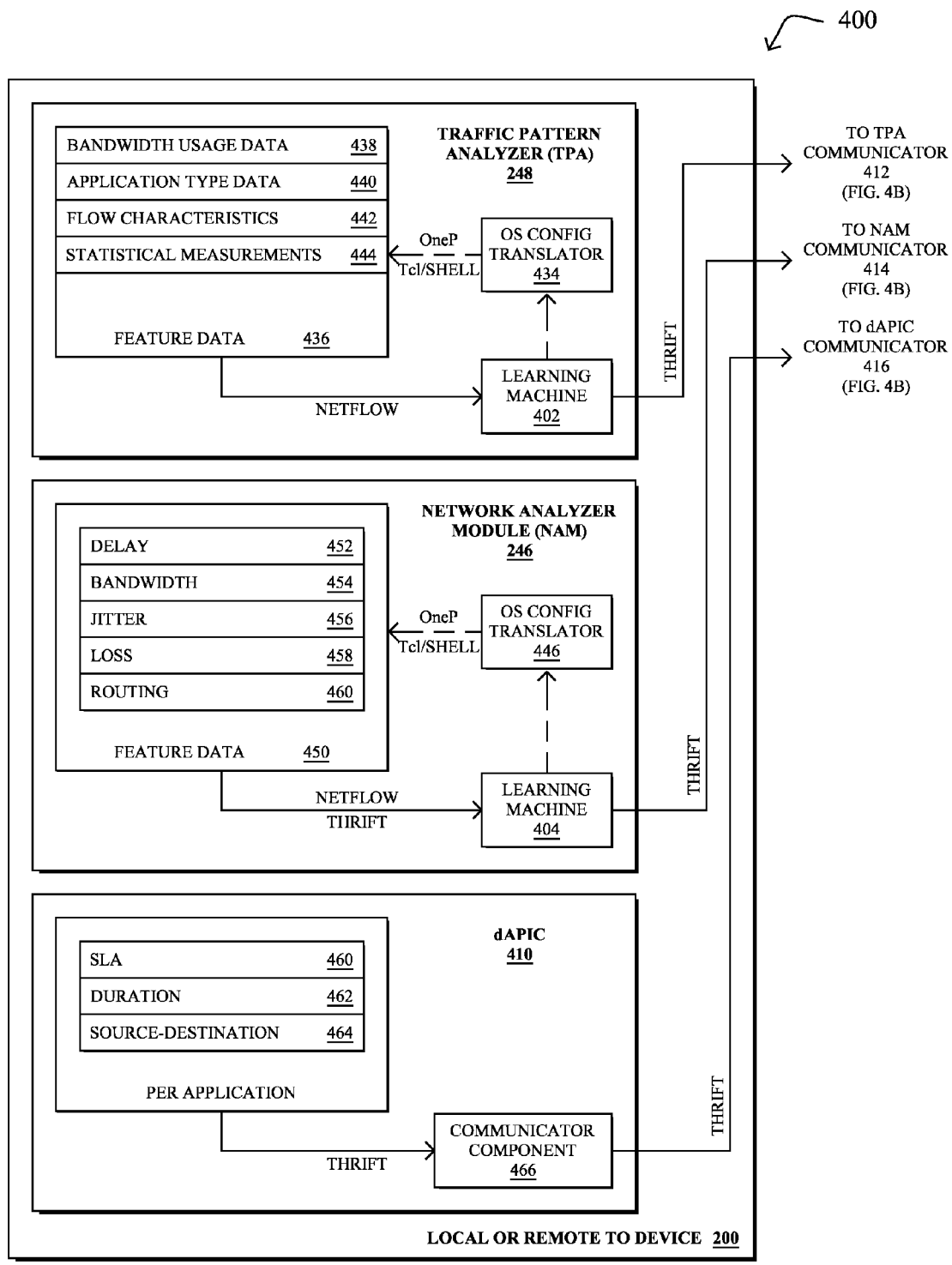
FIGS. 4A-4B illustrate an example architecture for predictive networking.
Figure 4B:
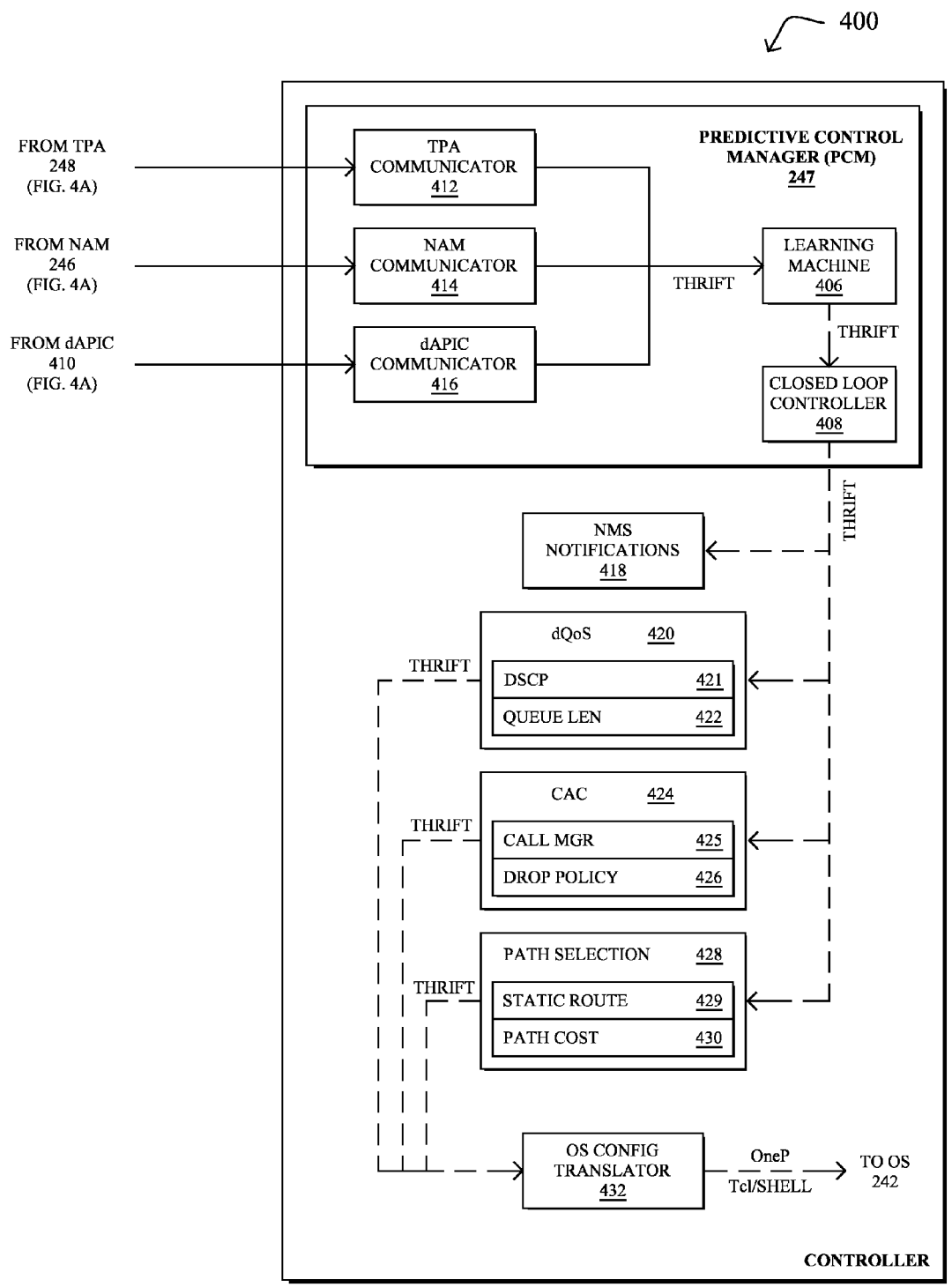
Figure 5:
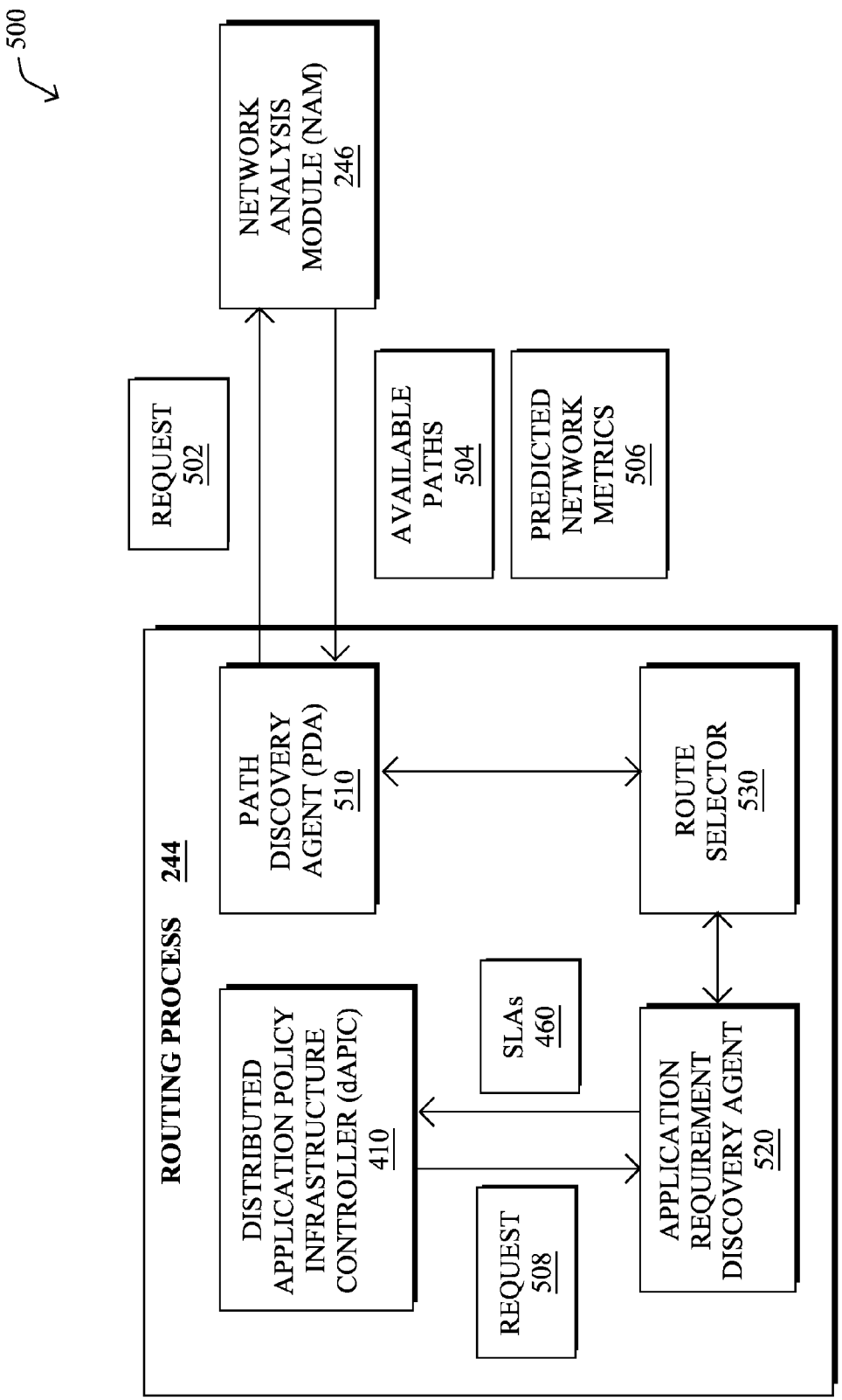
FIG. 5 illustrates an example architecture for making routing decisions based on predicted network conditions.

Referring now to FIGS. 4A and 4B, an example architecture 400 for predictive networking is shown in greater detail, according to various embodiments. As shown in FIG. 4A, TPA 248, NAM 246, and/or a dAPIC 410 may be local or remote to a given device 200. In FIG. 4B, PCM 247 may be hosted on a different device, such as a network controller, or may be integrated into the same device as that illustrated in FIG. 4A, in various embodiments.

Underlying the functionality of NAM 246, PCM 247, and/or TPA 248 may be learning machines 404, 406, and 402, respectively. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Learning machines (e.g., learning machines 402-406) are computational entities that rely on one or more machine learning processes for performing a task for which they have not been explicitly programmed to perform. In particular, learning machines are capable of adjusting their behavior to their environment. For example, a learning machine may dynamically make future predictions based on current or prior network measurements, may make control decisions based on the effects of prior control commands, etc.

Learning machines 402-406 may employ any number of different machine learning techniques. For example, artificial neural networks (ANNs) are a type of machine learning technique whose underlying mathematical models were developed inspired by the hypothesis that mental activity consists primarily of electrochemical activity between interconnected neurons. ANNs are sets of computational units (neurons) connected by directed weighted links. By combining the operations performed by neurons and the weights applied by the links, ANNs are able to perform highly non-linear operations to input data. The interesting aspect of ANNs, though, is not that they can produce highly non-linear outputs of the input, but that they can learn to reproduce a predefined behavior through a training process.

Other forms of machine learning techniques that may be employed by learning machines 402-406 may include, but are not limited to, support vector machines (SVMs), Bayesian networks, regression techniques (e.g., logistic regression, linear regression, non-linear regression, etc.), combinations thereof, or any other form of machine learning.

In various embodiments, TPA 248 may reside within a router or on a host computing device, and may have connectivity to one or multiple routers in the network. In general, TPA 248 may be operable to analyze every facet of the traffic flowing through the router. For example, TPA 248 may receive traffic-related data from the operating system of the device via an OS configuration translator 434, such as from an application visibility and control (AVC) process that is configured to classify traffic data according to application type (e.g., Cisco AVC® of Cisco Systems, Inc.), a network traffic flow process (e.g., Cisco IOS Flexible Netflow® of Cisco Systems, Inc.), a media metrics process (e.g., a process that generates metrics regarding video streams), etc. These or other such reporting technologies may be used by TPA 248 to compute a set of input feature data 436 (e.g., attributes that capture the characteristics of the traffic), that may be used by learning machine 402 to predict a traffic profile.

Feature data 436 may include any or all of the following information:

1.) Bandwidth Usage Data 438: In some cases, feature data 436 may include data regarding the bandwidth usage of a particular type of traffic (e.g., application-specific bandwidth usage information). This information may provide a profile of the traffic over the course of time to learning machine 402.

2.) Application Type Data 440: Feature data 436 may include data regarding the various application types associated with the traffic (e.g., VoIP, video, etc.). In various embodiments, application types may be determined based on the port numbers used, via an application recognition utility (e.g., Network Based Application Recognition® of Cisco Systems, Inc.), or the like.

3.) Flow Characteristics 442: In some cases, feature data 436 may include traffic flow information such as the duration of a flow, the rate of new flows, metrics capturing the rate of change of the previous metrics over time, or other such information. These flow characteristics may be captured from underlying infrastructures such as an application recognition utility, a call manager, or the like.

4.) Statistical Measurements 444: In some embodiments, feature data 436 may include statistical measurements regarding the flow of traffic. For example, measurements 444 may include data regarding the moments (e.g., variance, skewness, kurtosis, etc.) of the traffic distribution, both in terms of packets/sec and bytes/sec, on a per flow basis, or on a per time path basis. In another example, measurements 444 may include other statistical properties of the traffic flow, such as autocorrelation, Fourier series coefficients, etc.

Together, feature data 436 can be used by learning machine 402 to determine characteristics of the underlying traffic flow and how it changes with time. Once learning machine 402 starts to develop a time series model using these attributes, for example, it may decide that it needs more information about some of these features or, conversely, that some of these features are not relevant. In such cases, the update rate of the features may be adjusted accordingly by TPA 248 (e.g., to reduce the update rate of irrelevant data, etc.). In one embodiment, adjusting the refresh rate of feature data 436 may be policy-based to reduce traffic overhead in the network. For example, certain features may be collected or refreshed at different rates depending on the time of day, to reduce adverse effects on the network from the collection.

In some implementations, TPA 248 may require some processing capabilities that are not available on the router carrying the actual traffic itself. In such cases, TPA 248 may be hosted on a different router/host, which may be co-located either on a router blade (e.g., a UCS blade), or a different router/host connected to the router via a high bandwidth link.

According to various embodiments, NAM 246 may reside on the router processing the traffic under analysis itself or on a host that has network connectivity to the concerned routers. In general, NAM 246 may be operable to track all the network conditions that are visible to the corresponding router, in order to model the network performance characteristics. In contrast with reactive approaches, NAM 246 may be used to compute a model of the network performance using learning machine 404. For example, NAM 246 may determine the performance of each link/path available to connect a remote/branch office to a corporate network or headquarters.

Similar to TPA 248, NAM 246 may gather feature data 450 that is used as inputs to learning machine 404 (e.g., via OS configuration translator 446). For example, feature data 450 may be determined in part by sending probes between a given sender and a given responder, to capture metrics regarding the performance along the path. Other sources of feature data 450 may also include any or all of the sources used to determine feature data 436. In various embodiments, feature data 450 may include any or all of the following information:

1.) Delay Information 452: In some cases, feature data 450 includes delay measurements along a given network path and/or link.

2.) Bandwidth Information 454: Feature data 450 may also include bandwidth information associated with a given network path and/or link. For example, bandwidth information 454 may include data regarding the total bandwidth usage of the path or link, the per-application bandwidth usage of the path or link, available bandwidth along the path or link, etc.

3.) Jitter Information 456: Feature data 450 may further include jitter information associated with a given path and/or link. For example, the total amount or application-specific jitter measurements along a path or link may be included in feature data 450.

4.) Packet Loss Information 458: In some cases, feature data 450 may include packet loss information, such as a measured packet loss rate along a given path and/or link.

5.) Routing Information 460: Associated with any of data 452-458 may be information regarding a given network path (e.g., the link or set of links for which the measurements of data 452-458 were determined).

Learning machine 404 may continually track feature data 450 (e.g., as a time series model), to characterize these attributes. In other words, learning machine 404 may use a predictive model to predict future network performance metrics based on feature data 450. In some implementations, NAM 246 may also adjust the collection of feature data 450. For example, NAM 246 may configure one or more corresponding routers to generate more or less features based on the requirements of learning machine 404 (e.g., the amount of probing used may be adjusted as a function of the model's accuracy and confidence, based on network considerations such as current or future network usage, etc.).

In some embodiments, learning machine 404 may use the principle of data fusion to model the network performance metrics. This principle generally functions by integrating multiple data sources and knowledge about a real-world process (in this case, the underlying network), into an accurate representation of the functioning of the network. For example, bandwidth data 454 along a given path may be available from any of the following sources: (1) SLA processes may yield data about the delay, jitter and packet loss, which can, in some circumstances, be used to estimate the available bandwidth via a regression model, such as variational Bayesian least squares (VBLS) regression model, (2) actual bandwidth measurements can be taken occasionally, but with care as they affect the network performance, or (3) time-series models such as autoregressive moving average (ARMA) models, Hidden Markov Models, Gaussian Processes can be used to predict the performance evolution.

Feature data 450 available from various sources of information can be fused by NAM 246 in real time in a mathematically principled way by using a Kalman filter or graphical models, whereby the intrinsic uncertainty of each source of information is accounted for in the estimation of the data (e.g., available bandwidth, etc.). For example, if one makes a direct measurement of the actual bandwidth at time t, the uncertainty on this measure is very small, and it should therefore have a very strong impact on the estimation process at time t. However, as t increases, the uncertainty also increases as the actual bandwidth may drift away from the initial measurement. This drift may then be captured via a time-series model, and complemented by indirect measurements (e.g., based on delay, jitter, etc. measurements). As long as both sources agree, there is no reason to perform any further direct measurement, which may be very expensive, but if the prediction of the time-series model and the regression diverges, this may trigger another direct measurement. In some embodiments, NAM 246 may determine whether a direct measurement of any of feature data 450 is needed based on a measure of confidence associated with a model used by learning machine 404.

In some implementations, dAPIC 410 may store and provide various application-specific data via a communicator component 466. In general, dAPIC 410 may be operable to ensure that all the application SLAs are being met at all times in the network and, consequently, perform various actions without human intervention, to dynamically adapt the network behavior as needed. Accordingly, dAPIC 410 may have access to various application-specific SLA information such as SLA data 460 (e.g., a set of SLAs), duration data 462 regarding the SLAs (e.g., when a particular SLA is to be enforced), and/or source-destination data 464 regarding the network paths used by the various applications.

In various embodiments, TPA 248, NAM 246, and dAPIC 410 may provide data to PCM 247 shown in FIG. 4B, which may be co-located with these modules or may be hosted on another device (e.g., in a network controller, in the cloud, etc.). Accordingly, PCM 247 may include communicator modules 412, 414, and 416 to communicate with TPA 248, NAM 246, and dAPIC 410, respectively. In one embodiment, PCM 247 receives traffic model data generated by learning machine 402 from TPA 248 via communicator module 412. In a further embodiment, PCM 247 receives network performance model data generated by learning machine 404 from NAM 246 via communicator module 414. In yet another embodiment, PCM 247 may receive application-specific SLA data from dAPIC 410 (e.g., data 460-464), which may have information about all of the applications in the network, as well as their corresponding SLA requirements.

If an application SLA is predicted not to be met, PCM 247 may take any number of corrective measures to ensure that the SLAs continue to be met (e.g., by sending commands to OS 242 via an OS translator module 432). In some implementations, the corrective measures may be performed via a closed loop controller 408, thereby allowing feedback (e.g., updated predictions from TPA 248 and NAM 246) to be used by PCM 247 when taking corrective measures. In one embodiment, PCM 247 may generate and send a notification 418 to a network management system (NMS), allowing a human operator to intervene, if necessary, at the appropriate place and time in the network.

In another embodiment, PCM 247 may dynamically generate new QoS parameters 420 such that application-specific SLAs continue to be met. Example QoS parameters may include differentiated services code point (DSCP) parameters 421, queue length parameters 422, further parameters that change bandwidth percentage allocations to different classes, parameters that change the class of service for applications, etc.

In a further embodiment, PCM 247 may change call-admission control (CAC) policies 424 used as part of a communications management system. For example, CAC policies 424 may include parameters 425 for a call manager system (e.g., a system that tracks and manages active VoIP network components), drop policy parameters 426, or the like. Such parameters may be used, in some cases, to prevent admission of new traffic flows if the available bandwidth is already fully used.

In another embodiment, PCM 247 may generate path selection parameters 428. In general, path selection parameters 428 may operate to ensure that, based on a particular application type, the corresponding traffic is routed over different paths such that all applications continue to meet their SLAs. For example, path selection parameters 428 may include one or more static routes 429 to be used by a particular type of application traffic, path cost values 430 used to make routing decisions, or any other data that may be used to adjust which paths are used in the network by a particular type of application traffic. For example, traffic of class X may suddenly have to be routed over a 3G/4G link (although more costly) for a period of time T in order to meet the required SLA received from dAPIC 410 (e.g., application-specific SLAs 460), according to the predicted traffic from the TPA 248 and expected network characteristics from NAM 247.

Notably, such a predictive architecture 400 supports different modes of operation. In some cases, the system may request human intervention as part of the control loop. In other words, PCM 247 may operate as a distributed recommendation system for network parameter changes that should be adjusted in order to meet the SLAs (e.g., by sending NMS notifications 418 for review by a network engineer). In other cases, the system may be fully autonomous by employing closed loop control to make decisions on a router in real-time and report on the decisions to a human operator afterwards. As will be appreciated, the various modules described in architecture 400 may also communicate using remote procedure calls (RPCs) (e.g., using the Apache Thrift® protocol from the Apache Software Foundation or another RPC protocol), allowing the depicted modules to be co-hosted by a device or located remotely on different devices. Communications with the operating system of the device may also be performed using any suitable technique, such as by sending scripts through a Tcl/Shell.

As noted above, reliability SLAs may differ significantly across all of the different application types that traverse a WAN. For example, more critical applications, such as banking transactions, may require extremely high packet delivery rates, bounded delays or jitter, and/or a certain amount of bandwidth availability along a path. In such cases, path reliability may be the primary requirement for delivery of the application traffic. However, techniques that operate to ensure path reliability are also not without cost. For example, in optical domains, 1+1 techniques may be used whereby traffic is permanently duplicated along two diverse paths, to ensure that the traffic successfully reaches the destination. In packet-based networks, however, implementing such redundancies may be too costly due to bandwidth constraints, particularly at the edges of the networks, and due packet reordering when performing a switchover.

Soft Rerouting Using Predictive Reliability Metrics

The techniques herein allow for high network reliability to be maintained proactively for critical applications using predictive analytics. In some aspects, application network reliability SLAs may be gathered from an APIC controller (e.g., dAPIC 410) and checked against predictive reliability metrics from a model computed by a NAM (e.g., NAM 246). When it is determined that the reliability SLA is not likely to be met along a current path in use with a given probability for a period of time T, a soft 1+1 routing (S1R) mechanism may be used in which traffic is duplicated along a set of paths either permanently or temporarily (e.g., until the probability of meeting the application SLA crosses some threshold). Thus, in some cases, the S1R mechanism may be revertive and may entail only a soft duplication of highly sensitive traffic based on predictive analytics to guarantee the application SLA. In further aspects, a feed-back loop may be used to determine the effectiveness of the duplication process in light of previous routing decisions.

Specifically, according to one or more embodiments of the disclosure as described in detail below, a plurality of paths in a network from a source device to a destination device is identified. A predicted performance for packet delivery along a primary path from the plurality of paths is determined. The predicted performance for packet delivery along the primary path is then compared to a performance threshold. Traffic sent along the primary path may be duplicated onto a backup path selected from the plurality of paths, based on a determination that the predicted performance along the primary path is below the performance threshold.

Illustratively, the techniques described herein may be performed by hardware, software, and/or firmware, such as in accordance with processes 244, 246-248, which may include computer executable instructions executed by the processor 220 (or independent processor of interfaces 210) to perform functions relating to the techniques described herein. For example, the techniques herein may be treated as extensions to conventional protocols, such as the various networking protocols or wireless communication protocols, and as such, may be processed by similar components understood in the art that execute those protocols, accordingly.

Operationally, an example architecture 500 for making routing decisions based on predicted network conditions is shown, according to various embodiments. In particular, the routing process 244 shown in FIG. 2 may include various processes that facilitate the use of predictive reliability metrics (e.g., a predicted performance of one or more network paths), to make routing decisions that satisfy a reliability SLA for an application. For example, as shown, routing process 244 may include a path discovery agent 510, an application requirement discovery agent (PDA) 520, and a route selector 530, and/or dAPIC 410, to facilitate the use of a soft 1+1 routing mechanism. Any or all of processes 244, 246, 410, 510, 520, and 530 may be co-located on the same network device (e.g., a router) or distributed across different devices in the network. Accordingly, processes 244, 246, and 410 may communicate via RPC messages, such as unicast IPv6 messages carried over Thrift tunnels, in some embodiments.

In some embodiments, PDA 520 may be operable to send a request 502 to NAM 246 for information regarding network paths that are available to the device executing routing process 244 (e.g., a CE router). In response, NAM 246 may identify one or more network paths 504 to PDA 510, as well as predicted network metrics 506 that are associated with network paths 504. As described in detail above, learning machine 404 may use historical and/or current network conditions to model future network performance. For example, predicted network metrics 506 may include, but are not limited to, predicted delays, jitter, packet losses (e.g., dropped packets), path failures, combinations thereof, or any other metrics that can be used to represent a future performance of a given network path. Note also that some systems/devices (e.g., IoT routers, branch offices, etc.) may be equipped with backup connections such as, for example, cellular wireless links. Although more costly, such links may be used as necessary and may also be identified and analyzed by PDA 510. At this point, PDA 510 may have all predictive reliability models for each available network path.

In various embodiments, application requirement discovery agent 520 is operable to determine the SLA requirements for any application to be routed. For example, as shown, application requirement discovery agent 520 may send a request 508 to dAPIC 410 for the application-specific SLAs. In response, dAPIC 410 may send SLAs 460 and/or any SLA related data (e.g., SLA durations, etc.) to application requirement discovery agent 520. A particular SLA 460 may indicate, for example, the reliability objectives (e.g., the objective function) for a given type of application. Note that another functionality of discovery agent 520 may be to identify the types of applications that traverse the network and their associated requirements, source-destinations associated with the traffic types (e.g., source-destination data 464), the duration of flows, or other characteristics that can be used to accurately represent the applications in the network. In implementations in which dAPIC 410 is not co-located with application requirement discovery agent 520, request 508 may alternatively be sent to any other device in the network that stores the requested SLA data.

Route selector 530 may be operable to use an S1R strategy to route traffic, based on the predicted network metrics 506 retrieved by PDA 510 and on the application SLAs 460 retrieved by application requirement discovery agent 520. Such a strategy is considered "soft" in that packet duplication along different paths may be performed only temporarily if the probability that that the reliability SLA specified for a particular type of application falls below a threshold according to the predictive model computed by NAM 246. The set of traffic flows eligible for an S1R strategy may also vary over the course of time due to changing network characteristics.

Figure 6A:
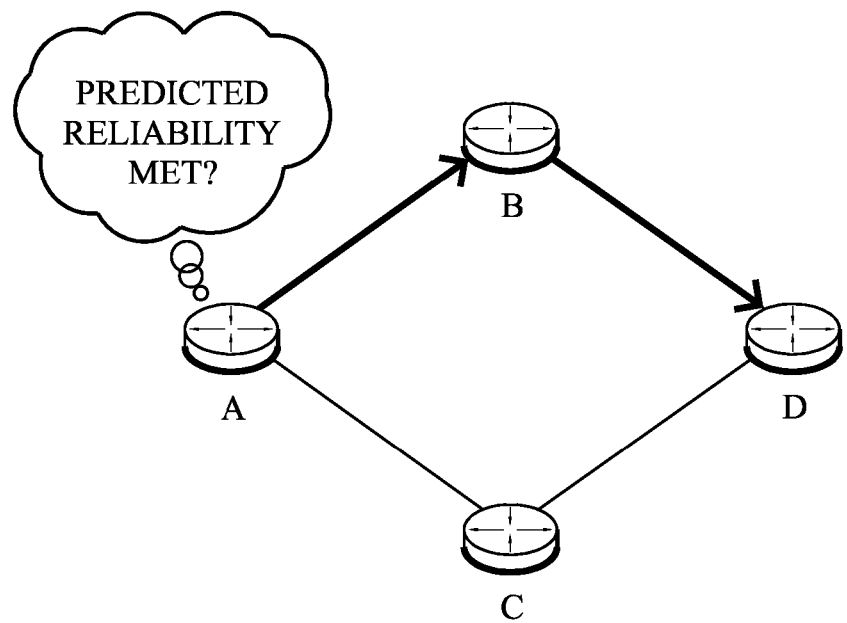
FIGS. 6A-6B illustrate an example of redundant routing being used based on predicted network conditions.
Figure 6B:
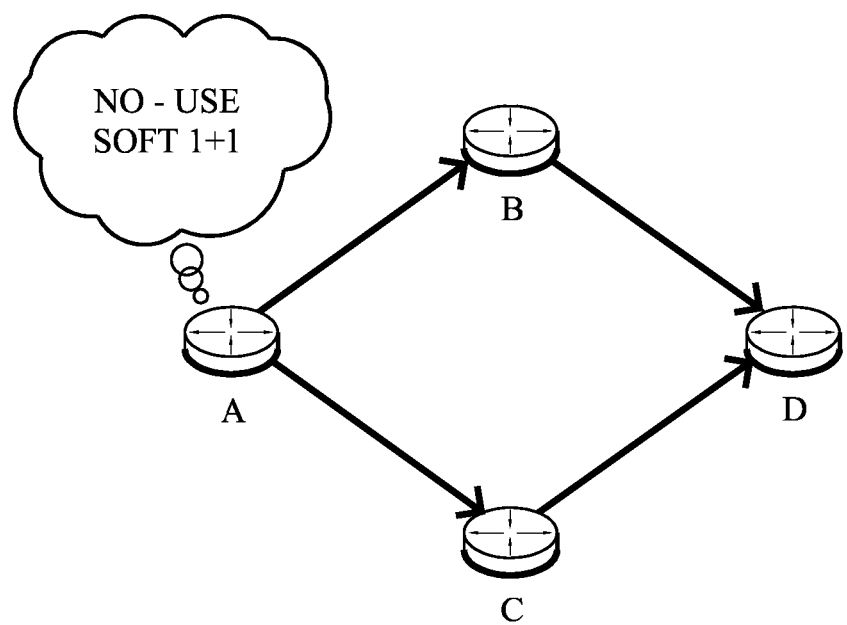

An example is shown in FIGS. 6A-6B of an S1R strategy being used to route traffic between routers (e.g., network devices 200 of FIG. 2). Assume for purposes of illustration that router A is attempting to send traffic of a particular application type to a router D over a primary path A→B→D and that a backup path A→C→D is also available. The two paths may be different paths within the same network or, alternatively, one of the paths may be a backup communication path through a different network (e.g., a backup connection through a wireless cellular network), in various embodiments. Now, assume that routing process 244 on router A has determined that the SLA for the type of application traffic to be routed requires a certain probability that packet drops will be below 1%. Further, assume that the predicted reliability for path A→B→C from NAM 246 indicates that the packet drop probability during the next x-number of minutes will be higher than 2% with a probability of 0.95. In such a case, router A may use an S1R strategy by duplicating the traffic along the alternate path A→C→D, as shown in FIG. 6B.

An S1R strategy may be implemented in various ways. In one embodiment, the router may place a temporary entry into one or more forwarding tables, to begin using an S1R strategy for a particular type of network traffic. Packet mis-ordering may also be avoided by including a duplication indicator with any duplicated traffic. For example, when the S1R starts, a duplication bit (a "Dup bit") may be inserted into an IPv4 or IPv6 header such as, for example, in the Flow Label field or in a newly defined IPv6 header. For all duplicated packets sent within a time period T1, the Dup bit may then be set to 1 and a time stamp may also be included with the packets. In some cases, T1 may be computed by multiplying the maximum delta between delays along the set of paths by a factor F. When a device such as router D shown in FIG. 6B receives a packet P, that has the Dup bit set, the device may buffer all such packets and perform packet reordering before forwarding the traffic to the destination. In addition, the device may also remove the timestamps and the Dup bit from the reordered packet stream. For TCP-based traffic the packet sequence number can be used instead of a timestamp to perform receiver based packet re-ordering, in one embodiment. In another embodiment, the extension header of the Parallel Redundancy Protocol (PRP) may be used instead of adding a Dup bit to an IP header.

Figure 7A:
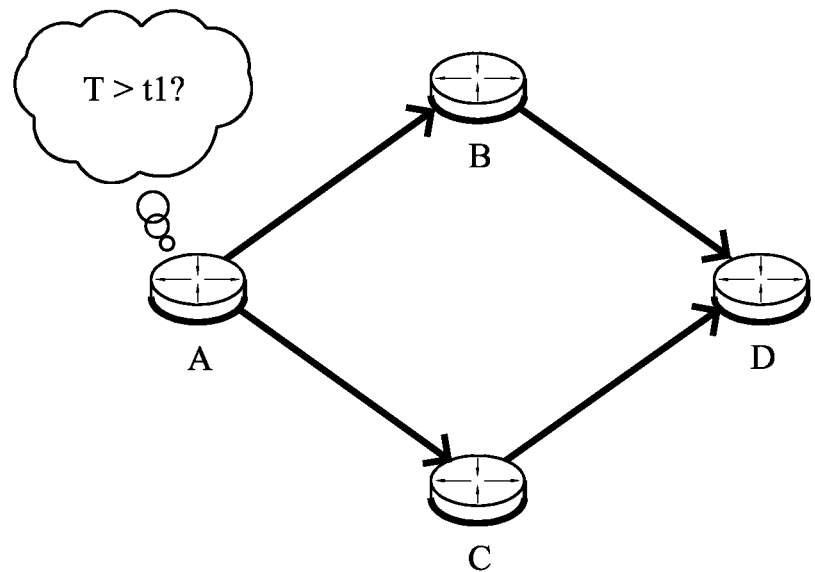
FIGS. 7A-7B illustrate an example of time-limited redundant routing.
Figure 7B:
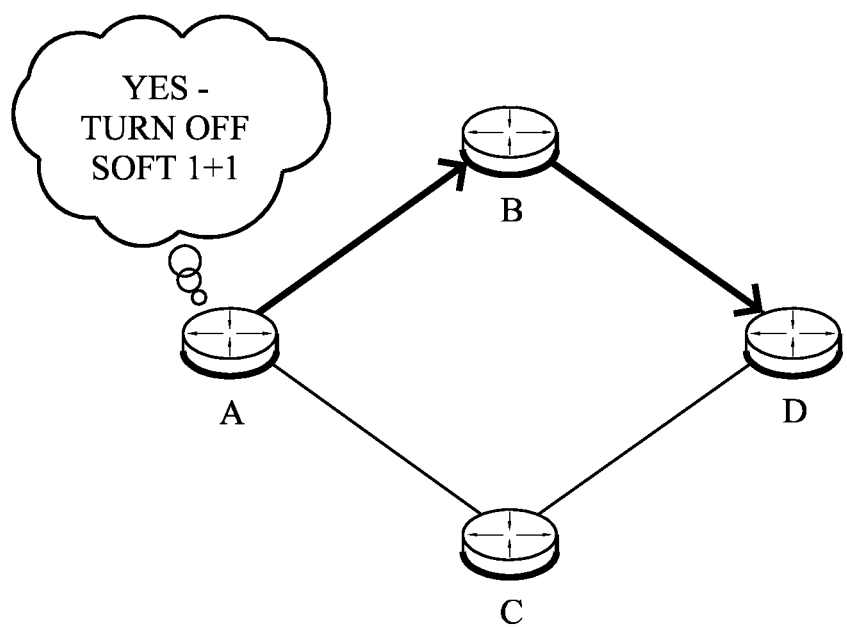
Figure 8A:
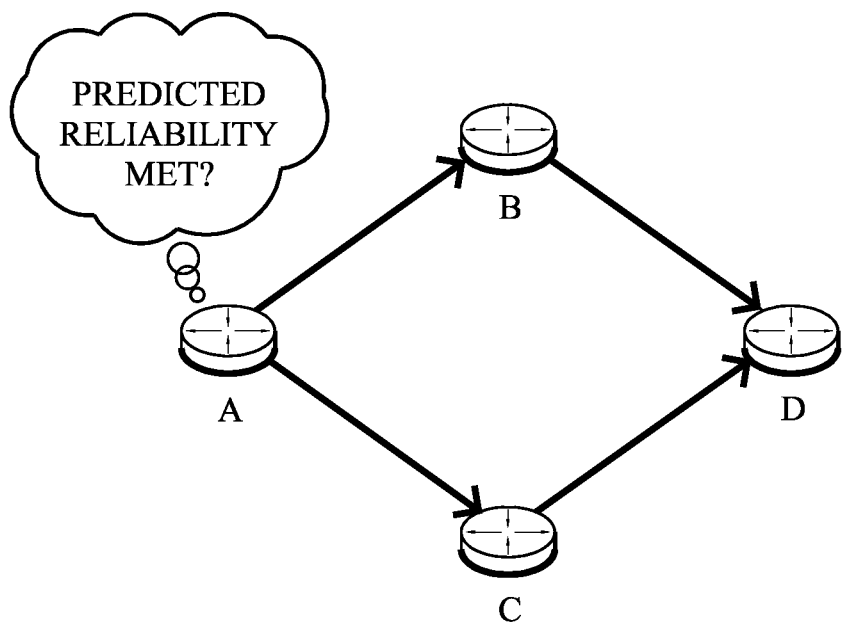
FIGS. 8A-8B illustrate an example of redundant routing being turned off based on predicted network conditions.
Figure 8B:
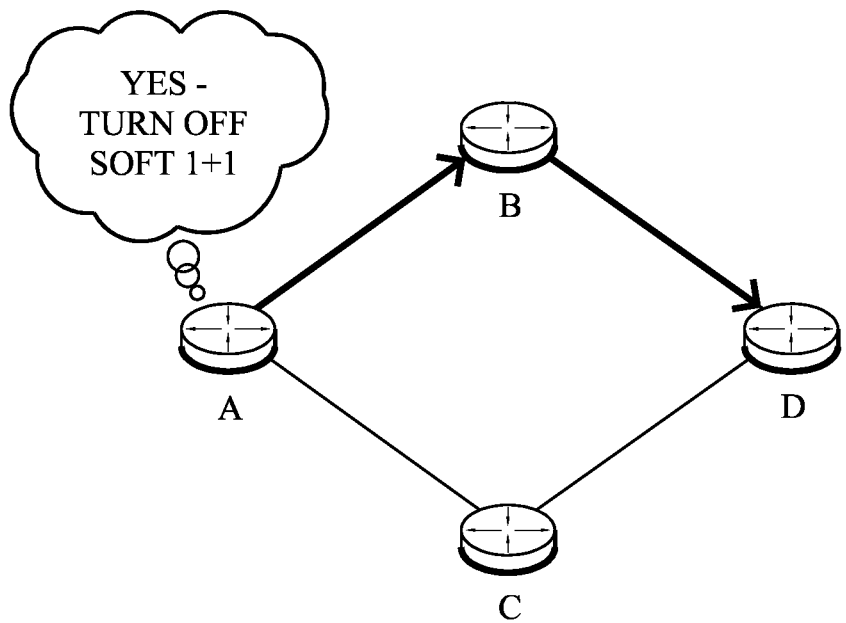

Generally speaking, an S1R strategy is "soft" in that the duplication of packets along different paths may be temporary in nature. In one embodiment, as shown in FIGS. 7A-7B, an S1R strategy may only be used during a time period calculated by NAM 246 (e.g., the predicted time during which the application SLA is predicted not to be met along the primary path). After conclusion of the time period, the sending router may cease using the S1R strategy and only use the primary path thereafter. In another embodiment, the device may not use a set time period but instead monitor the predicted performance of the network. For example, as shown in FIGS. 8A-8B, the sending router A may receive updated predictions from NAM 246, either on a pull or push basis, to evaluate whether the predicted reliability satisfies the SLA. If so, as shown in FIG. 8B, the router may cease using the S1R strategy and proceed to route further application traffic only along the primary path.

In some embodiments, once the primary (e.g., preferred) path becomes active again due to the expiration of the S1R time period, upon an updated prediction from NAM 246, etc., a similar process may be used to reinstate the S1R strategy at any time. In other words, the S1R process may be revertive, allowing the routing strategy to be adjusted according to changing network conditions. In addition, the number of backup paths selected may also vary. In other words, while a single backup path is depicted for purposes of illustration, traffic may be replicated onto a set of paths S where |S|>2, including potentially backup links such as a 3G/4G/LTE link, in other embodiments.

S1R activity may also be reported by a device to a central controller, to an NMS, to NAM 246, or to any other interested device or process. In some cases, this reporting may be used to track the use of backup links, as well as the financial costs of maintaining backup links. Further feedback/reporting may be provided by a device along the primary path to NAM 246 as part of a closed-loop mechanism that reinforces or corrects the S1R mechanism as needed. For example, a device may report to NAM 246 the number of packets that were lost when S1R was taking place by comparing packets that were arriving on one path and not on the other path. Further reporting may include the amount of un-used bandwidth that has been provisioned and is not being used. In addition to this, future trends can be customized based on the past behavior of the S1R mechanism.

Figure 9:
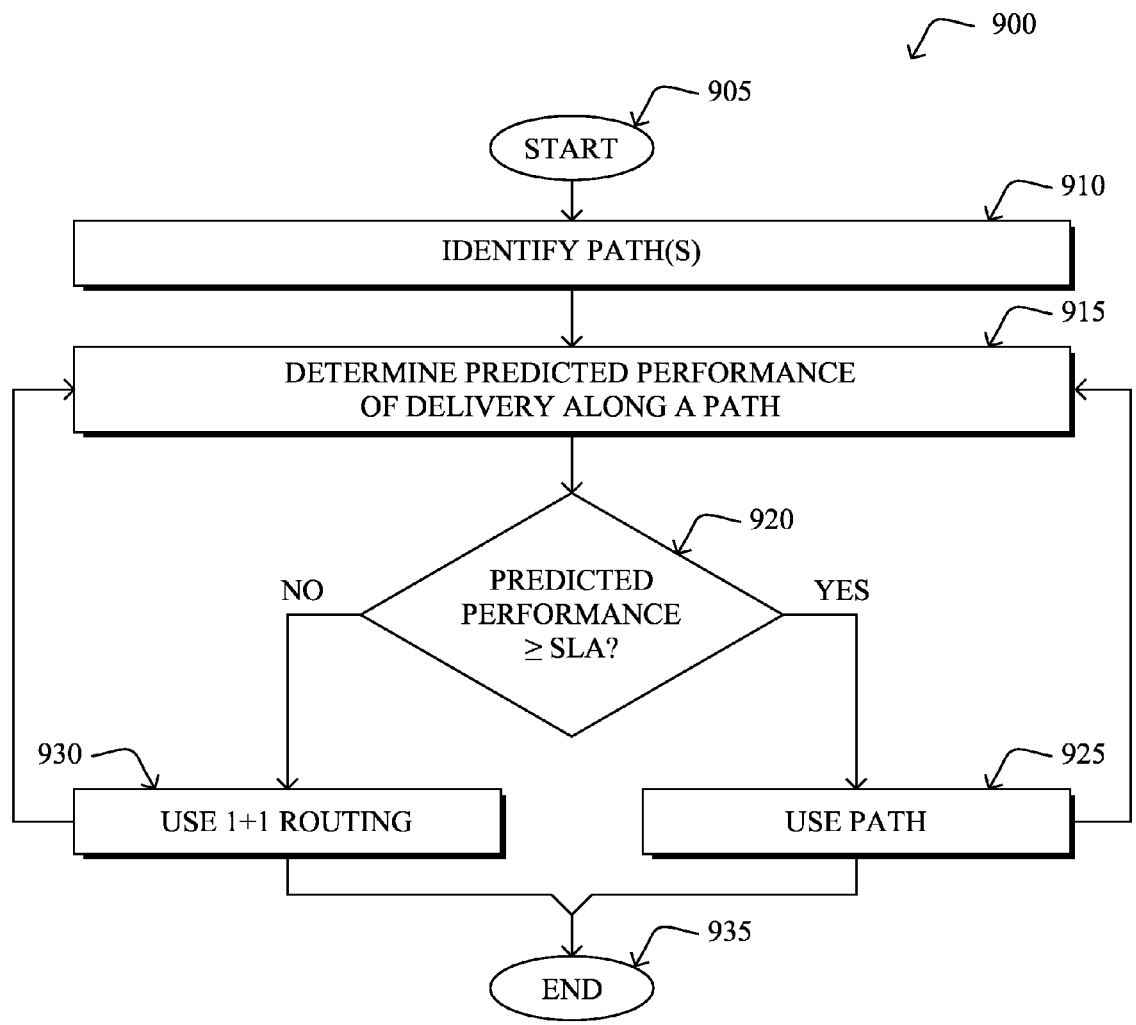
FIG. 9 illustrates an example simplified procedure for implementing soft redundant routing in a network.

FIG. 9 illustrates an example simplified procedure for implementing soft redundant routing in a network, in accordance with one or more embodiments described herein. The procedure 900 may start at step 905, and continues to step 910, where, as described in greater detail above, a plurality of network paths are identified between a source node and a destination node. In some implementations, the paths may be different routes that may be taken within the same network (e.g., an MPLS network). In other implementations, the paths may be through different networks or communication media. For example, the identified paths may include, but are not limited to, MPLS paths, wireless cellular paths (e.g. using a 3G, 4G, or LTE connection), paths using the public Internet, or the like.

At step 915, a predicted performance for traffic delivery along a particular path is determined, as described in greater detail above. In various embodiments, network characteristics may be used to predict future performance. For example, a learning machine may model performance along a network path using performance measurements along the path. Example metrics that may be used as input to the learning machine and/or may be predicted by the learning machine may include, but are not limited to, path delays, available bandwidth, jitter, packet loss, combinations thereof, or any other value that may be used to quantify the performance of the network path. In some cases, a predicted performance may also be associated with a particular point in time or a particular time period. For example, if the learning machine used to generate the prediction is based on a time series, a prediction may be associated with a future point in time. The path under analysis may also be, in some cases, a primary path that is selected according to an objective function. In other words, the predicted performance may be for a primary path that would otherwise be used to route a particular type of traffic.

At step 920, a decision is made as to whether or not the predicted performance of the primary path from step 915 satisfies an SLA, as highlighted above. In some cases, the SLA may be on a per-application basis. For example, traffic for one application type may be highly critical and have more stringent SLA requirements than traffic for another application type that is of lower priority.

If the predicted performance of the primary path satisfies the SLA requirements in step 920, procedure 900 may continue on to step 925 where the path is used to route traffic. However, if the predicted performance does not satisfy the SLA, procedure 900 may continue on to step 930 in which an S1R strategy is used or, alternatively, a soft 1+n approach may be used in which traffic is duplicated onto a plurality of backup paths. In various embodiments, as described in greater detail above, the S1R strategy may generally entail routing the traffic along the primary path as well as duplicating the traffic along one or more backup paths that were identified in step 910. For example, if the performance of the primary path is predicted to not meet the SLA of an application, one or more backup paths may be used to duplicate the traffic to the destination. Procedure may then continue on to step 935 and end. Alternatively, according to various embodiments, any or all of the steps of procedure 900 may be repeated for a given time period or until the predicted performance of the primary path satisfies the SLA.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a routing mechanism in which traffic to be sent along a primary network path may be duplicated along different paths based on predicted network metrics. The duplication may be performed on a temporary and adaptive basis, such as during a particular time period or until the performance of the primary path is predicted to satisfy an SLA for the traffic. While there have been shown and described illustrative embodiments that provide for predictive network control to be used in multicarrier WANs, it is to be understood that various other adaptations and modifications may be made within the spirit and scope of the embodiments herein. For example, the predictive networking techniques described herein may be adapted for use in other forms of networks, such as the IoT. In addition, the embodiments have been shown and described herein with relation to specific protocols and naming conventions for purposes of illustration. However, the embodiments in their broader sense are not as limited, and may, in fact, be used with other types of suitable protocols and/or naming conventions.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   identifying a plurality of paths in a network from a source device to a destination device;
   determining a predicted performance for packet delivery along a primary path from the plurality of paths;
   comparing the predicted performance for packet delivery along the primary path to a performance threshold, wherein the performance threshold depends on reliability requirements for a type of application traffic being delivered over the primary path;
   proactively duplicating traffic sent along the primary path onto a backup path selected from the plurality of paths based on a determination that the predicted performance along the primary path is below the performance threshold in a future time period;
   implementing a feedback control mechanism to determine how effective the proactive duplication is and adapting the proactive duplication based on the feedback control mechanism; and
   ceasing to duplicate the traffic onto the backup path once a determination is made that an actual performance of the primary path exceeds the performance threshold.

2. The method as in claim 1, further comprising:
   associating the backup path with a time period; and
   ceasing to duplicate the traffic onto the backup path after expiration of the time period.

3. The method as in claim 2, further comprising:
   selecting the time period based on a determination that the predicted performance for packet delivery along the primary path will meet or exceed the performance threshold after expiration of the time period.

4. The method as in claim 1, wherein the predicted performance for the primary path corresponds to at least one of: a predicted amount of packet loss along the primary path, a probability of a failure along the primary path, or a probability of a delay along the primary path.

5. The method as in claim 1, further comprising:
   selecting a plurality of backup paths from among the plurality of paths; and
   duplicating the traffic sent along the primary path onto the plurality of backup paths.

6. The method as in claim 1, wherein implementing a feedback control mechanism includes:
   determining an actual performance of packet delivery along the primary and backup paths; and
   using the actual performance to adjust when traffic will be duplicated along different paths.

7. The method as in claim 1, further comprising:
   indicating, within a packet header, that the traffic on the backup path was duplicated.

8. The method as in claim 1, further comprising:
   reporting duplication of traffic along the primary and backup paths to a network management server.

9. An apparatus, comprising:
   one or more network interfaces to communicate with a network;
   a processor coupled to the network interfaces and adapted to execute one or more processes; and
   a memory configured to store a process executable by the processor, the process when executed configured to:
     identify a plurality of paths in the network from a source device to a destination device;
     determine a predicted performance for packet delivery along a primary path from the plurality of paths;
     compare the predicted performance for packet delivery along the primary path to a performance threshold, wherein the performance threshold depends on reliability requirements for a type of application traffic being delivered over the primary path;
     proactively duplicate traffic sent along the primary path onto a backup path selected from the plurality of paths based on a determination that the predicted performance along the primary path is below the performance threshold in a future time period;

implement a feedback control mechanism to determine how effective the proactive duplication is and adapting the proactive duplication based on the feedback control mechanism; and cease to duplicate the traffic onto the backup path once a determination is made that an actual performance of the primary path exceeds the performance threshold.

10. The apparatus as in claim 9, wherein the process when executed is further operable to:

associate the backup path with a time period; and cease duplicating the traffic onto the backup path after expiration of the time period.

11. The apparatus as in claim 10, wherein the process when executed is further operable to:

select the time period based on a determination that the predicted performance for packet delivery along the primary path will exceed the performance threshold after expiration of the time period.

12. The apparatus as in claim 9, wherein the predicted performance for the primary path corresponds to at least one of: a predicted amount of packet loss along the primary path, a probability of a failure along the primary path, or a probability of a delay along the primary path.

13. The apparatus as in claim 9, wherein the process when executed is further operable to:

select a plurality of backup paths from among the plurality of paths; and duplicate the traffic sent along the primary path onto the plurality of backup paths.

14. The apparatus as in claim 9, wherein the process when executed is further operable to:

determine, using the feedback control mechanism, an actual performance of packet delivery along the primary and backup paths; and use the actual performance in the feedback control mechanism to adjust when traffic will be duplicated along different paths.

15. The apparatus as in claim 9, wherein the process when executed is further operable to:

indicate, within a packet header, that the traffic on the backup path was duplicated.

16. The apparatus as in claim 9, wherein the process when executed is further operable to:

report duplication of traffic along the primary and backup paths to a network management server.

17. A tangible, non-transitory, computer-readable media having software encoded thereon, the software when executed by a processor operable to:

identify a plurality of paths in a network from a source device to a destination device;

determine a predicted performance for packet delivery along a primary path from the plurality of paths;

compare the predicted performance for packet delivery along the primary path to a performance threshold, wherein the performance threshold depends on reliability requirements for a type of application traffic being delivered over the primary path;

proactively duplicate traffic sent along the primary path onto a backup path selected from the plurality of paths based on a determination that the predicted performance along the primary path is below the performance threshold in a future time period;

implementing a feedback control mechanism to determine how effective the proactive duplication is and adapting the proactive duplication based on the feedback control mechanism; and ceasing to duplicate the traffic onto the backup path once a determination is made that an actual performance of the primary path exceeds the performance threshold.

18. The computer-readable media as in claim 17, wherein the software when executed is further operable to:

associate the backup path with a time period; and cease duplicating the traffic onto the backup path after expiration of the time period.

* * * * *

UNITED STATES PATENT AND TRADEMARK OFFICE
CERTIFICATE OF CORRECTION

PATENT NO. : 9,887,874 B2
APPLICATION NO. : 14/276501
DATED : February 6, 2018
INVENTOR(S) : Jean-Philippe Vasseur et al.

Page 1 of 1

It is certified that error appears in the above-identified patent and that said Letters Patent is hereby corrected as shown below:

In the Specification

In Column 13, Line 32, please amend as shown:
in FIG. 6B receives a packet $P_1$ that has the Dup bit set, the Signed and Sealed this
Fifteenth Day of December, 2020

Andrei Iancu
*Director of the United States Patent and Trademark Office*